Patented Oct. 12, 1948

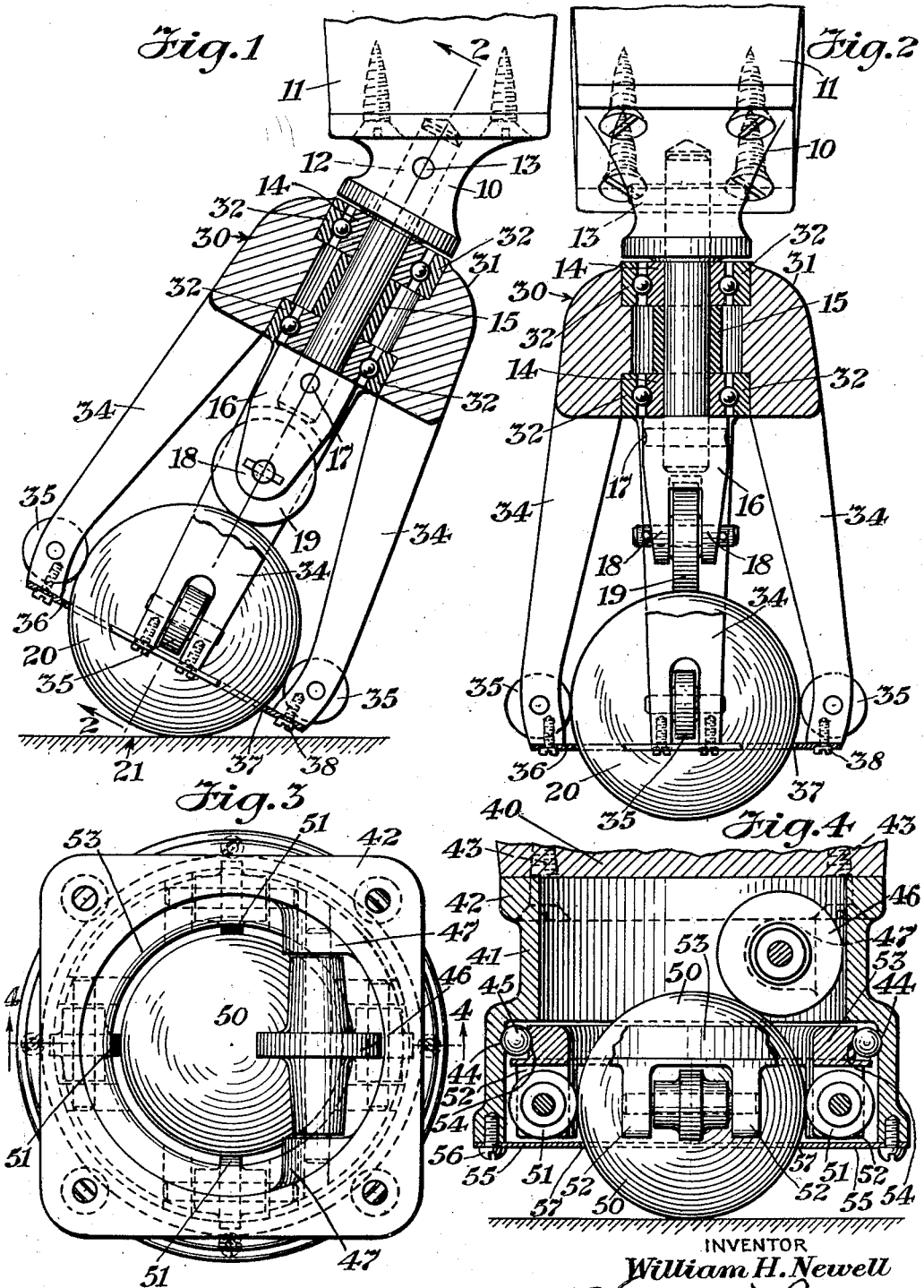

2,451,353

UNITED STATES PATENT OFFICE 2,451,353

BALL CASTER

William H. Newell, New York, N. Y., assignor to Ford Instrument Company, Inc., Long Island City, N. Y., a corporation of New York Application March 10, 1945, Serial No. 582,075

9 Claims. (Cl. 16—27)

This invention relates to ball casters and has for an object to provide a caster of the above type which is capable of rolling freely in all directions.

Another object of the invention is to provide a caster having novel and improved details of construction and features of operation.

Various other objects and advantages will be apparent as the nature of the invention is more fully disclosed.

Although the novel features which are believed to be characteristic of this invention are pointed out more particularly in the claims appended hereto, the nature and scope of the invention will be better understood by referring to the following description, taken in connection with the accompanying drawings in which certain specific embodiments thereof have been set forth for purposes of illustration.

In the drawings,

Fig. 1 is a side elevation, partly in section, of a caster embodying the present invention;

Fig. 2 is a side elevation, partly in section, looking in the direction of the arrows 2—2 of Fig. 1;

Fig. 3 is a top plan view of a caster illustrating a further embodiment of the invention; and Fig. 4 is a vertical section taken on the line 4—4 of Fig. 3.

Although certain specific terms are used herein for convenience, in referring to various details of the invention, it is to be understood that these terms are to be given an interpretation commensurate with the state of the art.

Referring to the drawings more in detail, particularly to Figs. 1 and 2, a caster embodying the present invention is shown as comprising a bracket 10 attached to the bottom of a pedestal 11 which the caster is adapted to support. The axis of the bracket 10 is inclined to the vertical. A bearing post 12 extends axially of the bracket 10 and is secured thereto by a pin 13. The post 12 carries inner ball races 14 which are spaced by spacing washer 15 and at its end carries a roller bracket 16 which is secured thereto by suitable means shown as a pin 17. The roller bracket 16 is provided with ears 18 in which a roller 19 is journalled. The arrangement is such that the roller 19 rotates about a horizontal axis. The roller 19 engages the surface of a ball 20 which constitutes the supporting member of the caster and is adapted to roll on a horizontal surface 21.

The ball 20 is retained by a ball supporting bracket 30 which is provided with a hub 31 carrying outer ball races 32 which register with the inner ball races 14 to provide ball bearings for the bracket 30 and permit the bracket to rotate freely about the axis of the bearing post 12.

The bracket 30 is provided with arms 34 which extend on opposite sides of the ball 20 and carry bearing rollers 35 which bear against the surface of the ball 20. The points of contact of the rollers 35 with the surface of the ball 20 lie in a diametrical plane of the ball which is inclined to the horizontal and is normal to the axis of the bearing post 12. The ends of the arms 34 extend past said diametrical plane and carry retaining plate 36 having an aperture 37 of a size to permit the ball 20 to rotate freely, but to prevent the ball from dropping from the caster when the pedestal is lifted. The retaining plate 36 is shown as secured to the arms 34 by screws 38.

In the operation of this caster it will be noted that the weight of the pedestal 11 is transferred through the bracket 10 and the bearing post 12 to the roller bracket 16, thence to the roller 19 and to the ball 20.

If the pedestal 11 is moved to the right or left, as viewed in Fig. 1, the ball 20 will roll about a horizontal axis extending through the points of contact of the front and back bearing rollers 35, which remains stationary while the right and left bearing rollers 35 rotate with the ball. The roller 19 likewise rotate with the ball, thereby forming with the right and left bearing rollers 35 a roller bearing for the ball 20.

If the pedestal 11 is moved to the right or left as viewed in Fig. 2, the roller 19 remains stationary and the ball 20 will roll about an axis passing through the point of contact of the roller 19 and the center of the ball. Since this axis is normal to the axes of the bearing rollers 35 the bearing rollers remain stationary in their respective arms 34 but the entire ball supporting bracket 30 rotates about the bearing post 12 on the ball bearings above described, thereby permitting free rotation of the ball 20 in the direction specified.

It is obvious that if the pedestal 11 is moved in an intermediate direction a combination of the two above described motions will take place. The ball 20 is thus free to roll in any direction on the supporting surface 21.

Referring now to Figs. 3 and 4, a modification of the above construction is shown in which the pedestal 40 carries a cylindrical housing 41 having a top flange 42 which is secured to the pedestal by suitable means shown as screws 43 and having at an intermediate position a ball race 44 which forms a bearing surface for balls 45. A roller 46 is journalled in bosses 47 formed on the housing 41 and arranged so that the roller 46 rotates about a horizontal axis. The roller 46 bears against ball 50 and is positioned so that the plane extending through the center of the ball 50 and the point of contact with the roller 46 is inclined to the vertical in the same manner as the bearing post 12 of Figs. 1 and 2.

In the embodiment of Figs. 3 and 4, bearing rollers 51 are mounted in ears 52 on a ring 53 having a ball race 54 which engages the balls 45 to provide a ball bearing for the ring 53 which permits free rotation of the ring 53 about a vertical axis. The bearing rollers 51 rotate about horizontal axes and contact the ball 50 in a horizontal plane extending through the center of the ball. A retaining plate 55 is attached to the bottom of the housing 41 by means of screws 56 and is provided with a central aperture 57 of a size to permit free rotation of the ball 50, but to confine the ball 50 against displacement when the pedestal 40 is lifted.

In this embodiment, if the pedestal 40 is moved to the right or left as viewed in Fig. 4, the ball 50 rotates about an axis extending through the points of contact with the front and rear bearing rollers 51, while the right and left rollers 51 and the roller 46 rotate with the ball 50. If, on the other hand, the pedestal 40 is moved to the front or rear, as viewed in Fig. 4, the roller 46 remains stationary and the ball 50 rotates about an axis extending through the center of the ball and the point of contact of the roller 46 with the surface of the ball, thereby causing the ring 53 to rotate about a vertical axis. Any component of the movement of the surface of the ball 50 relative to the bearing rollers 51 causes rotation of the rollers 51 about their respective axes. It is thus evident that the ball 50 of Figs. 3 and 4, like the ball 20 of Figs. 1 and 2, is free to roll in all directions when the pedestal 40 is moved over its supporting surface.

For convenience of illustration the operation of the bearing rollers 35 and 51 are described as for the positions shown. It will be evident however that as the ball supporting bracket 30 or the ring 53 rotate from the positions in which they are shown the bearing rollers will partake of components of rotation of the ball and permit free rotation of the ball in any direction regardless of the angle to which bracket 30 or the ring 53 may be turned.

Although certain specific embodiments of the invention have been shown and described, it is to be understood that the invention is capable of various uses and that changes and adaptations may be made therein as will be apparent to a person skilled in the art. The invention is only to be limited in accordance with the scope of the following claims.

What is claimed is:

1. A caster comprising a support to be attached to a pedestal, a ball positioned to roll on a surface, a roller mounted on said support to roll about a fixed horizontal axis and engaging said ball to carry the weight of said pedestal, the roller being so positioned that the line passing through the center of the ball and the point of contact of the ball and roller is inclined to the vertical, and a set of bearing rollers disposed about said ball to contact the surface of said ball in the same diametric plane thereof, said bearing rollers being mounted to rotate about axes in the said diametric plane and a carrier for said bearing rollers mounted to rotate freely about an axis normal to said plane.

2. A caster comprising a support to be attached to a pedestal, a ball positioned to roll on a surface, a roller mounted on said support to roll about a fixed horizontal axis and engaging said ball to carry the weight of said pedestal, the roller being so positioned that the line passing through the center of the ball and the point of contact of the ball and roller is inclined to the vertical, and a set of bearing rollers disposed about said ball to contact the surface of said ball in a horizontal diametric plane thereof, said bearing rollers being mounted to rotate about axes in the said diametric plane and a carrier for said bearing rollers mounted to rotate freely about an axis normal to said plane.

3. A caster comprising a support to be attached to a pedestal, a ball positioned to roll on a surface, a roller mounted on said support to roll about a horizontal axis and engaging said ball to carry the weight of said pedestal, the roller being so positioned that the line passing through the center of the ball and the point of contact of the ball and roller is inclined to the vertical, and a set of bearing rollers disposed about said ball to contact the surface of said ball in a diametric plane thereof, which is normal to said line, said bearing rollers being mounted to rotate about axes in the said diametrical plane and a carrier for said bearing rollers mounted to rotate freely about an axis normal to said plane.

4. A caster comprising a support to be attached to a pedestal, a ball positioned to roll on a surface, a roller mounted on said support to roll about a fixed horizontal axis and engaging said ball to carry the weight of said pedestal, the roller being so positioned that the line passing through the center of the ball and the point of contact of the ball and roller is inclined to the vertical, and a set of bearing rollers disposed about said ball to contact the surface of said ball in the same diametric plane thereof, said bearing rollers being mounted to rotate about axes in the said diametric plane and a carrier for said bearing rollers, and ball bearings supporting said carrier to rotate freely about an axis normal to said plane.

5. In combination, a ball, a support, a first roller mounted on said support to engage the surface of said ball and to rotate about an axis fixed relative to said support, a plurality of bearing rollers disposed about said ball to contact the surface thereof in a diametric plane which is disposed at a fixed angle to the line passing through the center of the ball and the point of contact of the ball with the said first roller, a carrier supporting said plurality of rollers for rotation about axes lying in said plane, and means mounting said carrier for rotation about an axis normal to said plane.

6. A caster comprising a support, a roller mounted for rotation about an axis fixed relative to said support, a ball in contact with said roller, a plurality of rollers disposed to contact the surface of said ball in a diametric plane thereof, a carrier supporting said plurality of rollers for rotation about axes lying in said plane, and means mounting said carrier for rotation about an axis normal to said plane.

7. A caster comprising a support, a roller mounted for rotation about an axis fixed relative to said support, a ball in contact with said roller, a plurality of rollers disposed to contact the surface of said ball in a diametric plane thereof, a carrier supporting said plurality of rollers for rotation about axes lying in said plane, and means mounting said carrier for rotation about an axis normal to said plane and passing through the center of said ball.

8. A caster comprising a support, a roller mounted for rotation about an axis fixed relative to said support, a ball in contact with said roller and having its center in the plane of rotation of said roller, a carrier mounted for rotation about an axis fixed relative to said support and passing through the center of said ball, and a plurality of rollers in contact with said ball and mounted on said carrier for rotation about axes lying in a plane perpendicular to the axis of rotation of said carrier.

9. A caster comprising a support, a roller mounted for rotation about an axis fixed relative to said support, a ball in contact with said roller and having its center in the plane of rotation of said roller, a carrier mounted for rotation about an axis fixed relative to said support and passing through the center of said ball, and a plurality of rollers in contact with said ball and mounted on said carrier for rotation about axes lying in a plane perpendicular to the axis of rotation of said carrier and containing the center of the ball.

WILLIAM H. NEWELL.

REFERENCES CITED

The following references are of record in the file of this patent:

UNITED STATES PATENTS

| Number | Name | Date |
|---|---|---|
| 406,185 | Weir | July 2, 1889 |
| 903,850 | Fenney | Nov. 17, 1908 |
| 1,024,835 | Doak | Apr. 30, 1912 |
| 1,033,264 | Oppy | July 23, 1912 |
| 1,224,294 | Franzen | May 1, 1917 |

FOREIGN PATENTS

| Number | Country | Date |
|---|---|---|
| 326 | Great Britain | Jan. 24, 1880 |
| 2,572 | Great Britain | Nov. 5, 1853 |
| 2,610 | Great Britain | Feb. 19, 1887 |
| 394,267 | France | Nov. 21, 1908 |